(12) United States Patent
Hart

(10) Patent No.: US 10,293,738 B2
(45) Date of Patent: May 21, 2019

(54) SELF-CONTAINED, MOBILE RACK REPAIR METHOD AND TRAILER

(71) Applicant: Hauser Business Enterprises Inc., Lynn, IN (US)

(72) Inventor: Abe Hart, Lynn, IN (US)

(*) Notice: Subject to any disclaimer, the term of this patent is extended or adjusted under 35 U.S.C. 154(b) by 61 days.

(21) Appl. No.: 15/699,279

(22) Filed: Sep. 8, 2017

(65) Prior Publication Data

US 2018/0072213 A1    Mar. 15, 2018

Related U.S. Application Data

(60) Provisional application No. 62/385,306, filed on Sep. 9, 2016.

(51) Int. Cl.
*B62D 33/04* (2006.01)
*B60P 3/14* (2006.01)
(Continued)

(52) U.S. Cl.
CPC .............. *B60P 3/14* (2013.01); *B60P 1/435* (2013.01); *B60P 3/064* (2013.01); *B62D 33/04* (2013.01);
(Continued)

(58) Field of Classification Search
CPC .. B60P 1/43; B60P 1/435; B60P 3/064; B62D 53/061; B62D 33/04; B66F 9/06
(Continued)

(56) References Cited

U.S. PATENT DOCUMENTS 6,332,549 B1 * 12/2001 MacDonald ......... A47B 47/027
                                                                211/182
8,955,897 B1 *  2/2015 Miller ..................... B60P 3/14
                                                                296/24.32
(Continued)

*Primary Examiner* — Pinel E Romain
(74) *Attorney, Agent, or Firm* — Overhauser Law Offices LLC

(57) ABSTRACT

A novel method of repairing and modifying a heavy-duty industrial rack includes: a) providing an enclosed trailer having: 1) a forklift compartment; 2) a ramp for the loading and unloading a forklift and its payload to and from the trailer; 3) a forklift for moving a rack to and from the trailer; 4) a rack repair compartment; 5) rack repair raw materials; 6) at least one rack component bonding apparatus for bonding components of the rack; 7) at least one rack component bending apparatus; 8) at least one rack machining apparatus; and 9) a hitch for coupling the trailer to a truck for moving the trailer to a new location when desired; and b) moving the trailer to an onsite location having a rack targeted for repair or modification. The method also at least includes: c) unloading the forklift from the trailer via the ramp; d) driving to the forklift to the targeted rack; e) lifting the targeted rack and transporting it to the trailer; f) loading the targeted rack onto the trailer via the ramp; g) locating the targeted industrial rack in the rack repair compartment; h) performing repairs or modifications on the rack; i) after pairs or modifications, lifting and removing the rack from the trailer via the forklift and the ramp; j) driving the repaired or modified rack to an onsite location; and k) unloading the repaired or modified rack from the forklift. A novel trailer apparatus is separately disclosed.

16 Claims, 10 Drawing Sheets

(51) Int. Cl.
  *B60P 1/43*   (2006.01)
  *B65G 69/28*  (2006.01)
  *B62D 53/08*  (2006.01)
  *B66F 9/06*   (2006.01)
  *B60P 3/06*   (2006.01)
  *B62D 53/06*  (2006.01)

(52) U.S. Cl.
  CPC ........... *B62D 53/061* (2013.01); *B62D 53/08* (2013.01); *B65G 69/2811* (2013.01); *B66F 9/06* (2013.01)

(58) Field of Classification Search
  USPC ...................................................... 296/24.32
  See application file for complete search history.

(56) References Cited

U.S. PATENT DOCUMENTS

| | | | | |
|---|---|---|---|---|
| 9,221,502 | B2* | 12/2015 | Nauert | B62D 33/04 |
| 9,308,853 | B2* | 4/2016 | Raemsch | B60P 3/42 |
| 9,975,749 | B2* | 5/2018 | Roberson | B66F 7/20 |
| 2014/0119864 | A1* | 5/2014 | Kiragu | B60P 3/14 |
| | | | | 414/538 |
| 2017/0088032 | A1* | 3/2017 | Nielsen | B60P 3/14 |
| 2017/0217396 | A1* | 8/2017 | Paunov | B60P 1/435 |
| 2018/0304942 | A1* | 10/2018 | Schattgen | B62D 53/061 |

* cited by examiner

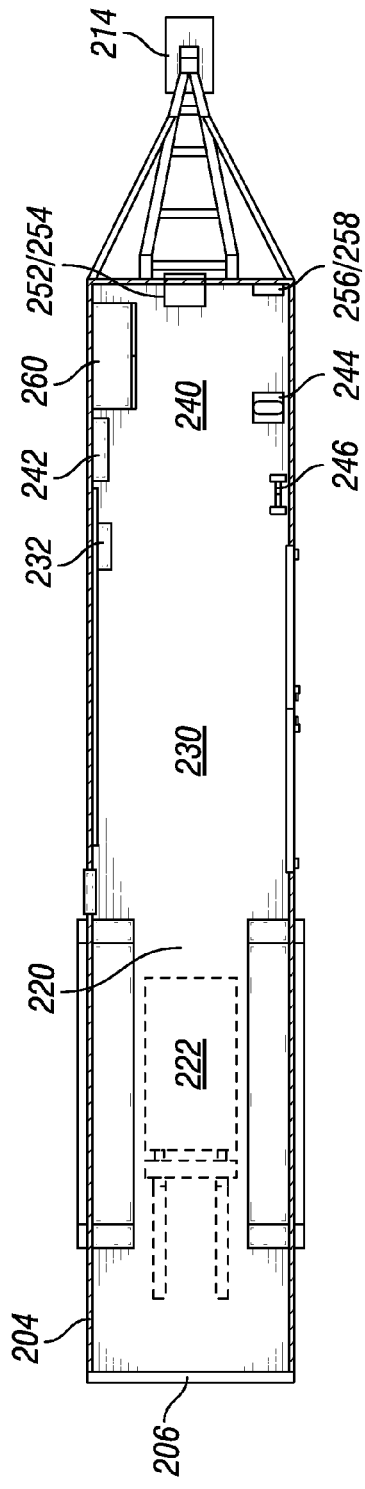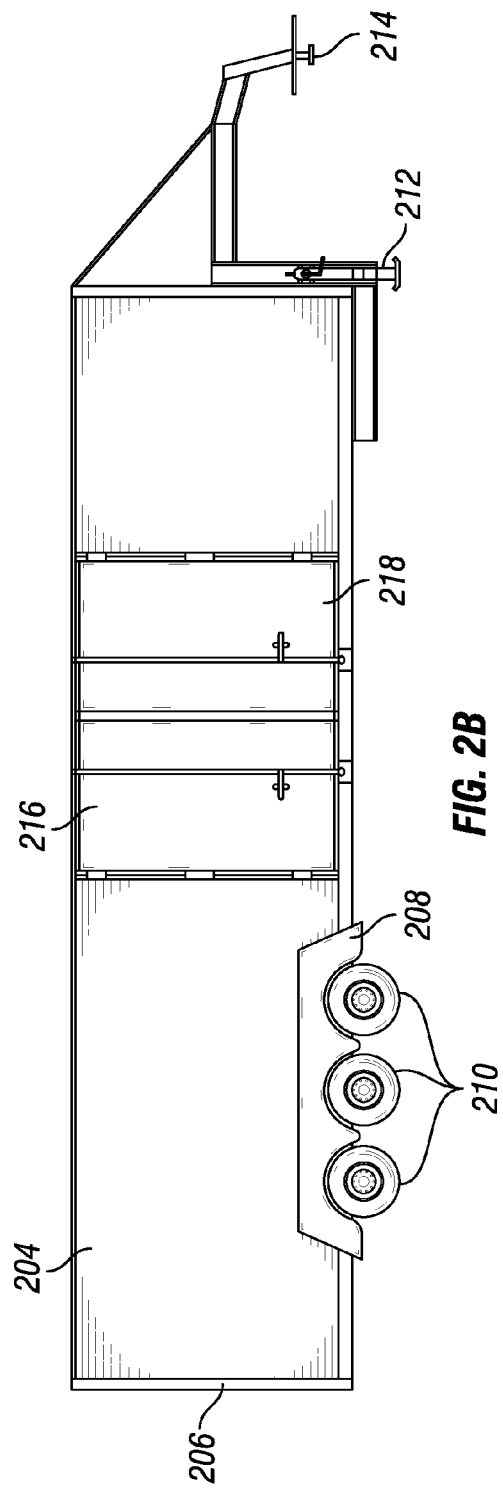
FIG. 2A
FIG. 2B

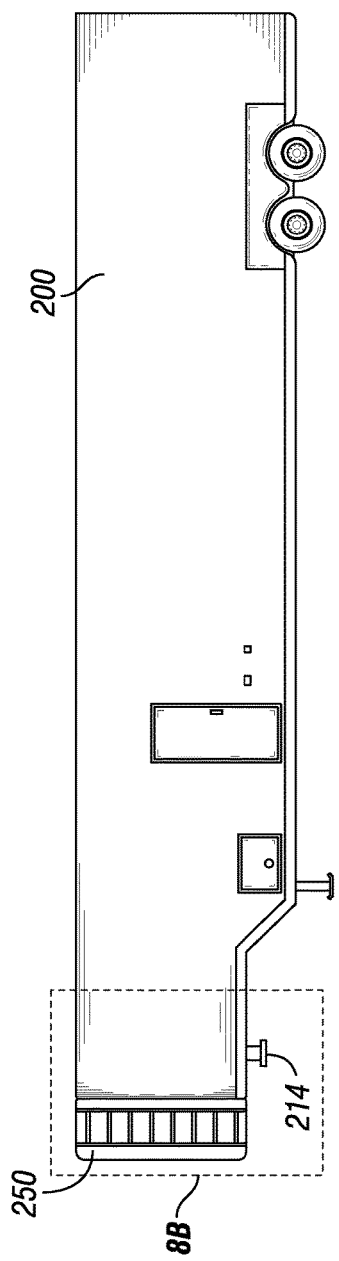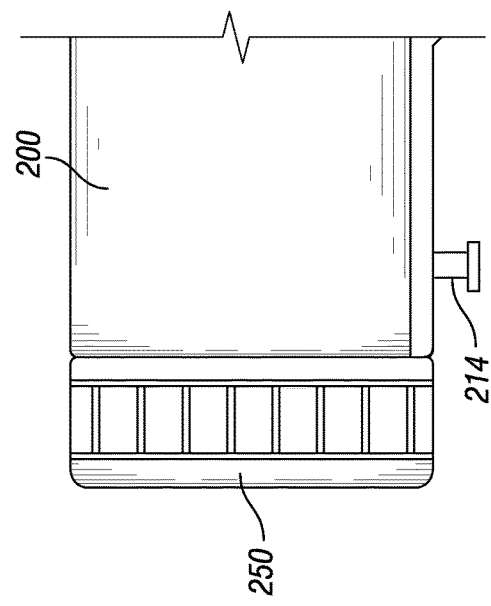

SELF-CONTAINED, MOBILE RACK REPAIR METHOD AND TRAILER

CROSS-REFERENCE TO RELATED APPLICATIONS

This U.S. non-provisional patent application claims the benefit of and priority to U.S. provisional patent application Ser. No. 62/385,306 filed 9 Sep. 2016 entitled "Self-Contained, Mobile Rack Repair Method and Trailer", the entire contents of which is specifically incorporated herein by reference.

FIELD OF THE INVENTION

The present invention relates to the repair of heavy-duty industrial racks.

BACKGROUND

This invention relates to the efficient repair and modification of existing large, heavy-duty industrial racks ("racks") of the type used for the convenient and temporary hanging and storage of heavy components. While the present invention is much broader in scope, an example of such a rack is one used in a factory setting as part of an ongoing manufacturing process in the automotive industry for hanging multiple heavy parts (e.g., transmissions) until the parts are ready for their eventual inclusion in a larger production unit as shown in FIG. 1.

Given the robust structural requirements, racks of the above type are very heavy and expensive, and pose unique challenges when there is a need to repair them (e.g., as a result of damage or unacceptable deformations) or modify them. The challenges include a lack of parts or raw material needed to repair the rack and a lack of the special equipment needed to repair the rack.

The prior art approach to repairing industrial racks is to ship them offsite to a facility having the necessary heavy duty welding, bending, and other repair apparatuses, as well as having the necessary repair raw materials. In addition to the cost of shipping the rack to the repair facility and back, the time needed to accomplish the shipping can significantly slow and even halt factory production in the interim. What is therefore sorely needed but not provided by the prior art is an approach for achieving substantial cost and time reductions during the repair or modification of heavy-duty industrial racks.

SUMMARY OF THE INVENTION

The present invention includes a novel enclosed trailer at least including: a designated forklift compartment adapted to accommodate a forklift: a ramp operatively coupled to the forklift compartment for the loading and unloading of the forklift and its payload to and from the trailer; a designated rack repair compartment adapted to accommodate the industrial rack during repairs or modifications; a rack for repair raw materials adapted to be utilized in the repair or modification of the industrial rack in the trailer; at least one rack component bonding apparatus for bonding components of the rack to be repaired or modified; a metalworking compartment with at least one rack component bending apparatus for bending components of the rack to be repaired or modified and at least one rack machining apparatus for machining components of said rack to be repaired or modified; and a hitch adapted to operatively couple the trailer to a truck for moving the trailer to a new location when desired; wherein the trailer is adapted to be a movable, self-contained industrial rack repair and modification unit capable of onsite industrial rack repairs and modifications.

This disclosure provides a method of repairing and modifying a heavy-duty industrial rack, at least including: a) providing an enclosed trailer, the trailer having 1) a designated forklift compartment adapted to accommodate a forklift, 2) a ramp operatively coupled to the forklift compartment for the loading and unloading of the forklift and its payload to and from the trailer, 3) a compartment capable of holding a forklift adapted to lift and move a heavy duty industrial rack from an onsite location to the trailer for repair or modification of the industrial rack, and for lifting and removing the industrial rack from the trailer back to the onsite location after repair or modification of the industrial rack, 4) a designated rack repair compartment adapted to accommodate the industrial rack during repairs or modifications, 5) a compartment for rack repair raw materials adapted to be utilized in the repair or modification of the industrial rack in the trailer, a metal working compartment with 6) at least one rack component bonding apparatus for bonding components of the rack to be repaired or modified, 7) at least one rack component bending apparatus for bending components of the rack to be repaired or modified, 8) at least one rack machining apparatus for machining components of the rack to be repaired or modified, and 9) a hitch adapted to operatively couple the trailer to a truck for moving the trailer to a new location when desired b) moving the trailer via a truck to a location having an industrial rack targeted for repair or modification; c) transporting the targeted industrial rack to the trailer; d) loading the targeted industrial rack onto the trailer with a forklift and via the ramp; e) locating the targeted industrial rack in the designated rack repair compartment; f) performing desired repairs or modifications on the targeted industrial rack in the designated rack repair compartment; g) after repairs or modifications, removing the targeted industrial rack from the trailer via the ramp; h) returning a repaired or modified targeted, industrial rack to an onsite location; and i) unloading the repaired or modified targeted, industrial rack to the onsite location.

BRIEF DESCRIPTION OF THE DRAWINGS

FIG. 2a shows a side view of an embodiment of a trailer used to repair or modify industrial racks according to the present invention.

FIG. 2b shows a top view of an embodiment of a trailer used to repair or modify industrial racks according to the present invention.

FIG. 8a shows side view of the exterior of the trailer used to repair or modify industrial racks according to the present invention.

FIG. 8b shows a side view of the exterior of a hitch and an accessory compartment portion of a trailer used to repair or modify industrial racks according to the present invention.

DETAILED DESCRIPTION

Figure 1:
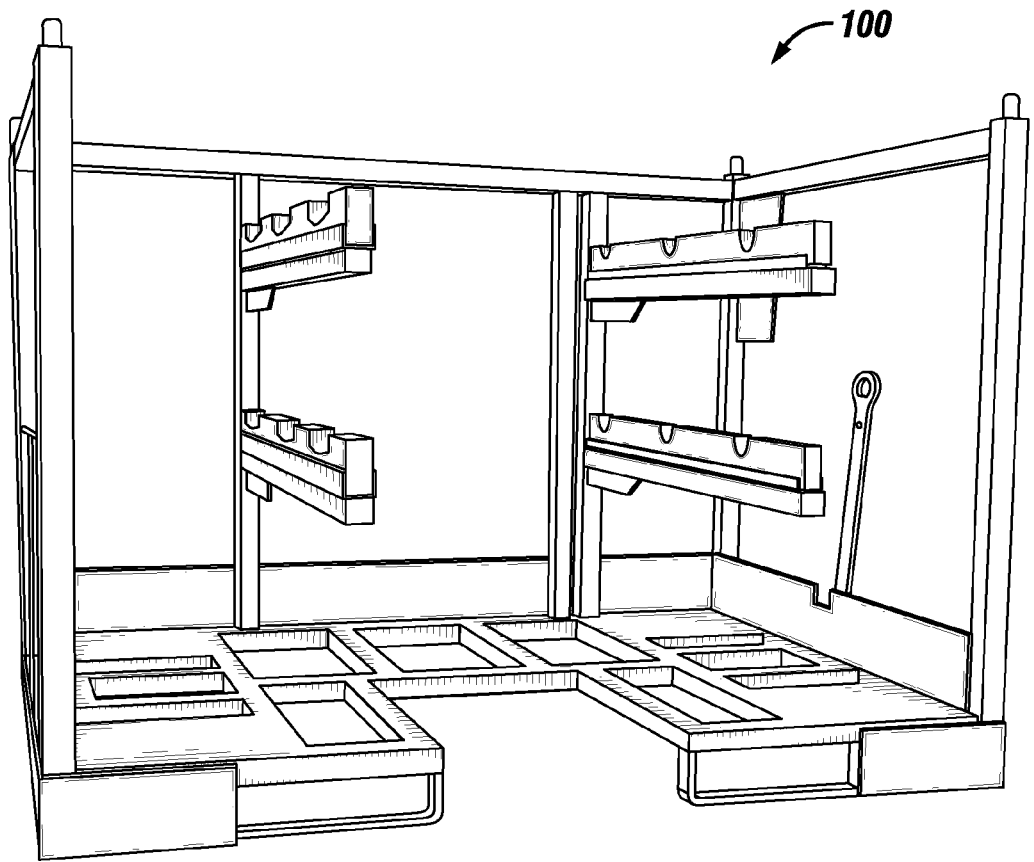
FIG. 1 is a perspective view of an example of a heavy-duty, industrial strength rack that could be repaired or modified using the present invention.

For the purposes of promoting an understanding of the principles of the invention, reference will now be made to the embodiments illustrated in the drawings and specific language will now be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Disclosed is a novel approach to repairing and modifying heavy duty, industrial-strength fixtures such as the one shown in FIG. 1. The example given of a fixture 100 has several high-strength members for accommodating several heavy manufacturing components at once until they are ready for inclusion in the manufacturing process. For example, the rack 100 can carry several transmissions waiting to be used in an engine manufacturing process. It will be appreciated by those skilled in the art that the fixtures are not limited to a particular type, nor limited to a particular industry. When a fixture becomes damaged due to breakage, bending, collision and the like, repair becomes necessary to maintain the integrity of the fixture for continued use.

Figure 5:
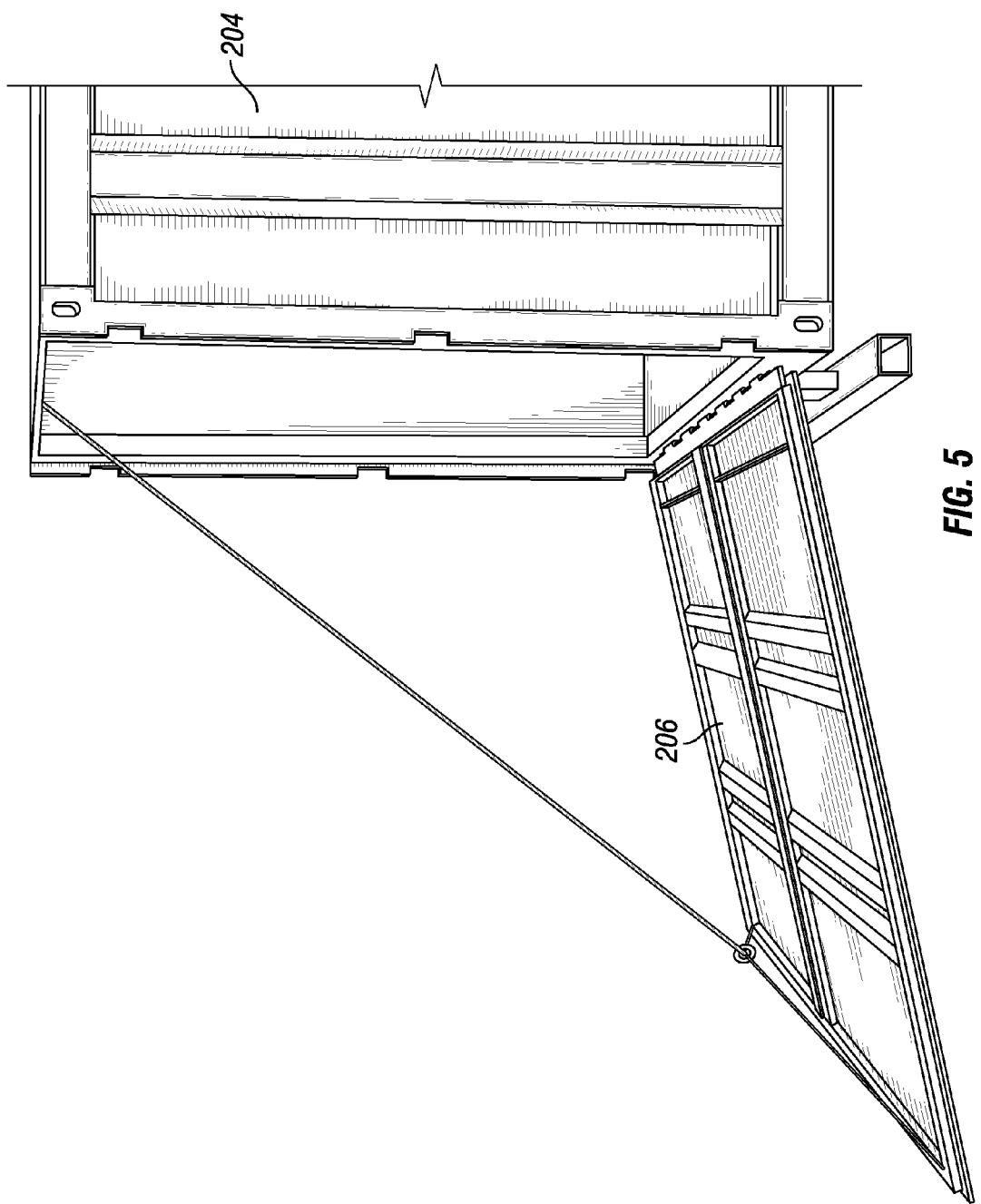
FIG. 5 shows an embodiment for a trailer rear door which opens to form a ramp according to the present invention.

One embodiment of a repair trailer 200 of the present application is shown in FIGS. 2a and 2b of a top view and side view, respectively. Trailer 200 is the size of the commonly known semi-trailer but is not limited to any particular size and can be sized for truck, rail or sea transport carriers. In the example given, the load capacity is 44,000 pounds, and it has three axles rather than the two axles of most semi-trailers. In FIG. 2b, the trailer 200 is fully enclosed by its body 204 to protect the contents and the repair processes carried out in the trailer from the elements. The rear door 206 is specially constructed to convert into a heavy-duty ramp of such strength to handle the weight of a common industrial truck and a fixture to be repaired. The ramp 206 is further illustrated in its deployed position in FIG. 5. In particular embodiment, the bottom, back edge of the trailer is no more than 24 inches above the ground. Thus, when the back door is deployed as a ramp and engages the ground, the angle of the ramp permits a forklift to be safely driven into or out of the trailer.

Wheel wells 208 cover the multiple, primary load-bearing wheels 210 of the trailer. Further detail of the reinforced wheel wells 208 of the trailer 200 can be seen in FIG. 3b. In the preferred embodiment, the trailer 200 includes side doors 216, 218 for the side entry of racks and personnel when needed, a heavy-duty jack stand 212, and a pivotal hitch 214 for pivotally hitching the trailer to a truck for transport of the trailer to repair sites. Further details are shown in FIG. 3c of the hitch 214 as part of the trailer 200 when it is connected to a truck or hauling equipment 300 adequate to haul the trailer 200 with its various components.

Figure 4:
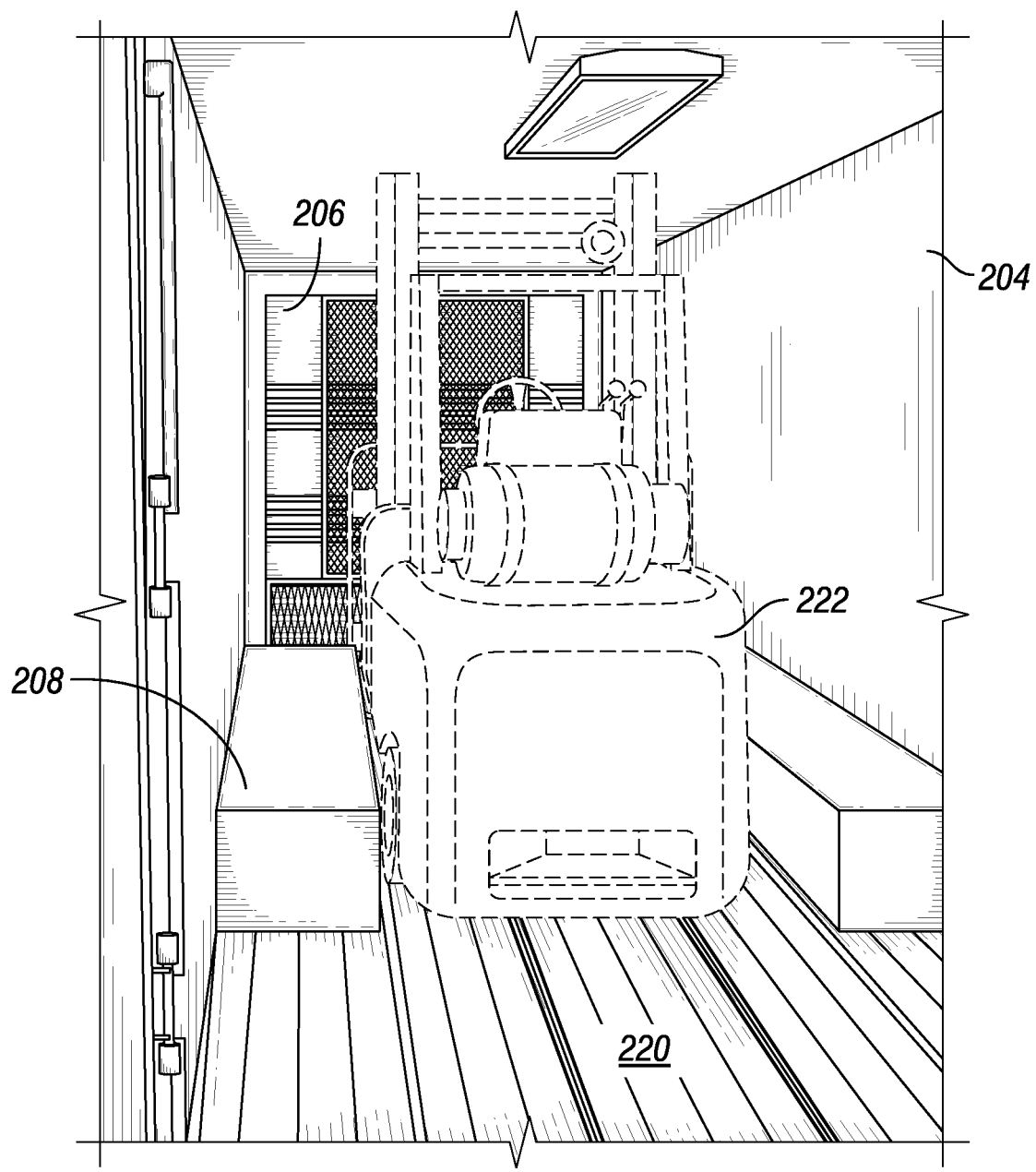
FIG. 4 shows the interior of the trailer including a transport compartment.

As can be seen from the top view of FIG. 2a, the trailer 200 has a designated transport compartment 220 designed to housing a piece of industrial equipment such as a forklift 222. Further details of the transport compartment 220 are shown in FIG. 4. The transport compartment 220 is shown being located in the trailer body 204 approximately in the area of the back door 206 and the wheel wells 208. The transport compartment 220 is ideally located over the primary load bearing wheels 212 and at the rear end of the trailer 200 for optimal weight balance and operation when carrying a piece of industrial equipment 222 in the transport area 220. The industrial equipment or forklift 222 can be used to lift and transport fixtures targeted for repair from the factory floor into the trailer 200.

Figure 6:
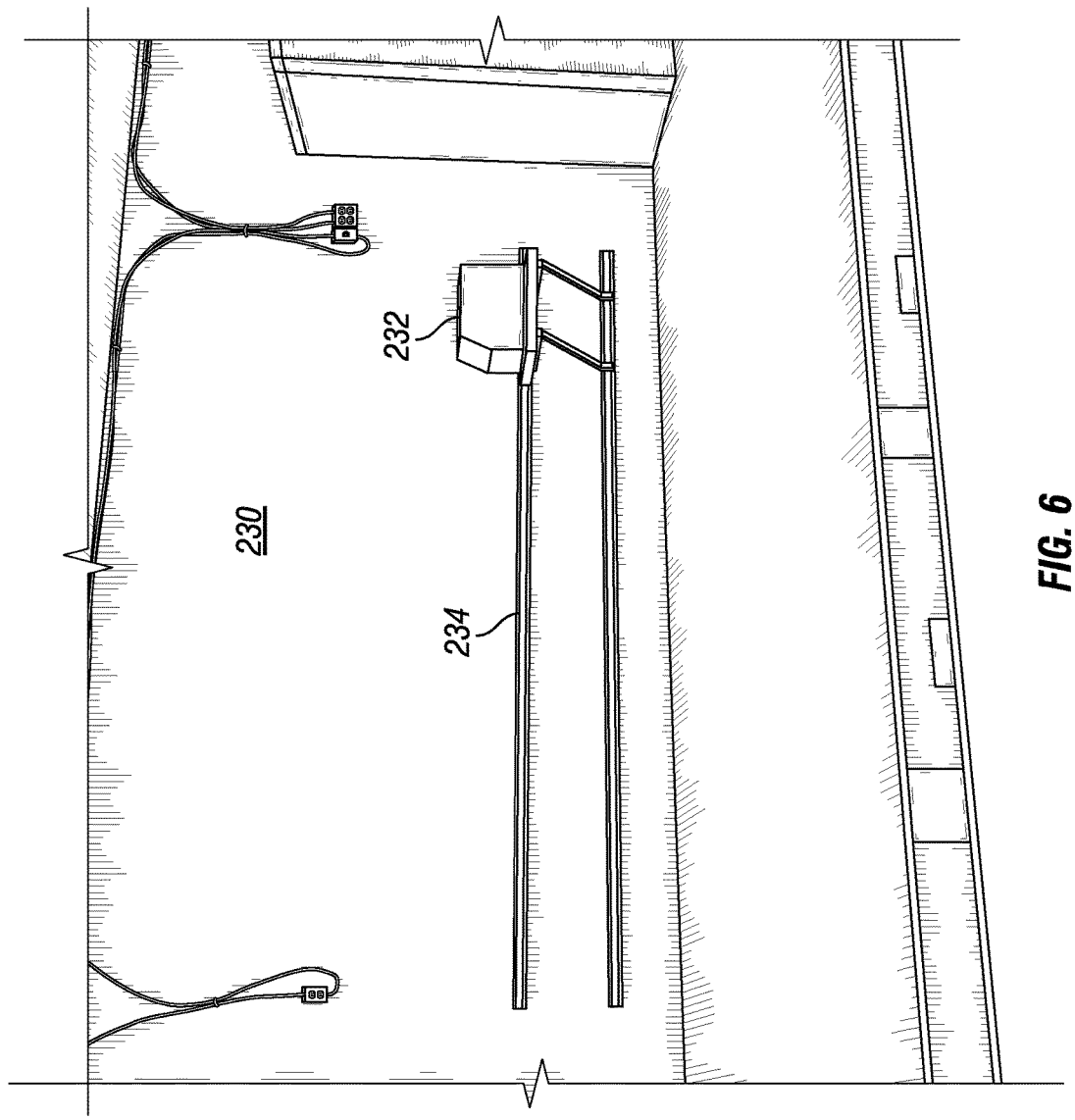
FIG. 6 shows the interior of the trailer repair compartment. The rails on which the welder slides are also visible.

A designated repair compartment 230, ideally located approximate to the side doors 216, 218, provides space within the trailer 200 needed to place a fixture or rack while it is being repaired or modified. FIG. 6 shows the repair compartment 203 with a heavy duty welding machine 232 to weld rack components positioned on rails 234 attached to a wall of the trailer body 204. The rails 234 allow better access to the various parts of a fixture being repaired that need to be welded.

Figure 7:
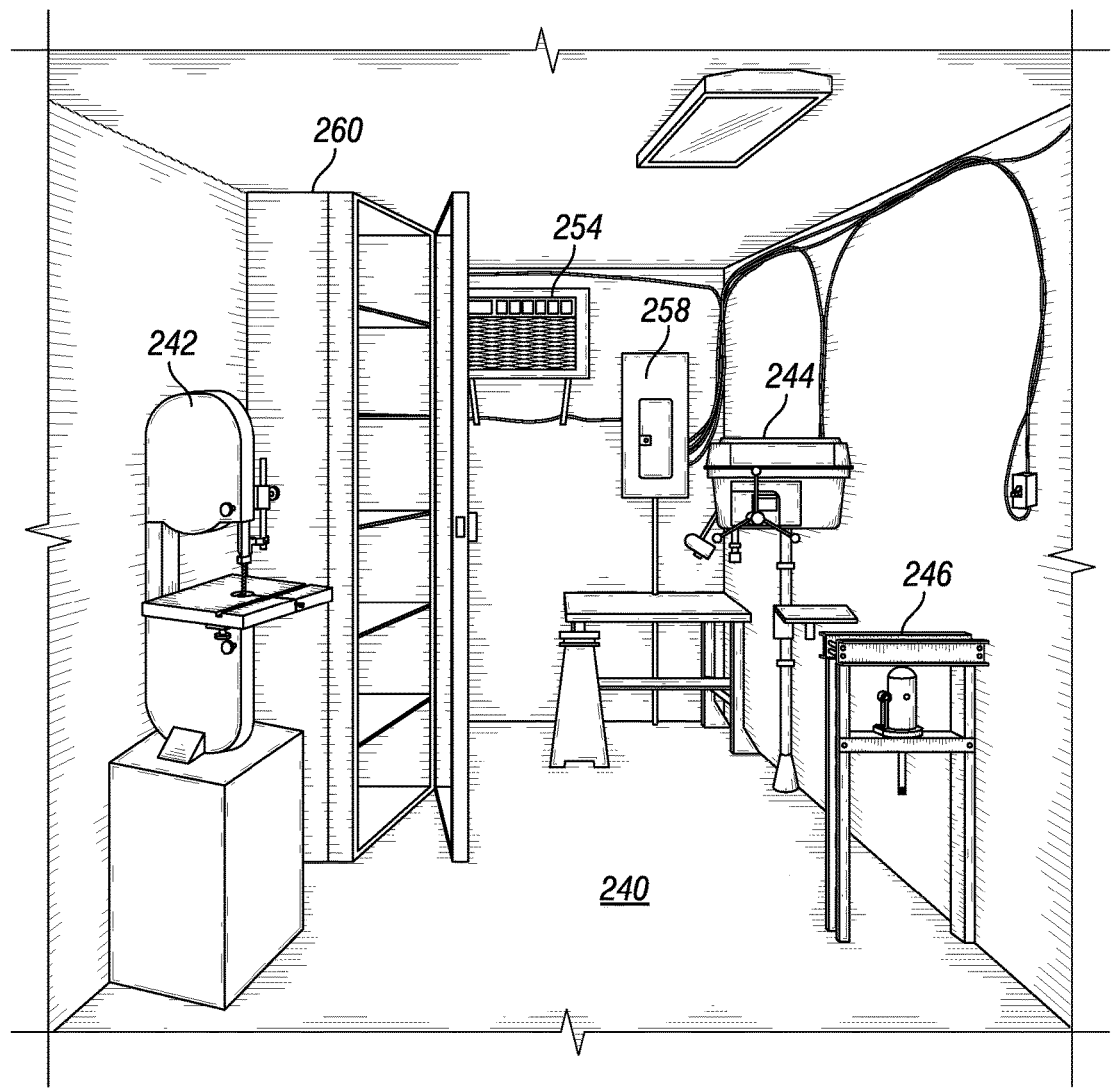
FIG. 7 shows the interior of the trailer including as metal working compartment.

A metal working compartment 240 stores stationary and mobile power equipment for carrying out repairs. FIG. 7 shows the metal working compartment 240 with the power repair equipment which includes, but is not limited to, a horizontal handsaw 242; a grinder with cut-off and grinding wheels; a drill press 244; and a hydraulic press 246 to straighten or bend metallic members.

As the trailer 200 is capable of full enclosure, it will be appreciated that the features could include such components as an exhaust fan unit 252 for exhausting noxious fumes during repair processes and a heating and cooling unit 254 to adjust the internal ambient temperature as needed. The trailer interior can also be provided with interior lights, which may be power either by a batteries or generator 256 breaker box 258 to which the other power tools may be connected.

The trailer 200 contains or may carry a power generator 256 with a separate fuel supply for independently powering the trailer equipment as needed for all rack repairs and modifications. The generator provides power to a breaker box 258 which further feeds power to the remaining electrical-driven components in the trailer.

FIGS. 8a and 8b show a trailer 200 with an accessory compartment 250 which may include components such as the exhaust fan unit 252, the heating and cooling unit 254, batteries, the generator 256, the breaker box 258 and the like.

A storage cabinet 260 can hold a variety of miscellaneous tools (including clamps and others) as well as raw material used in repairs. As a matter of design choice the raw materials can be stored elsewhere, including a special, dedicated repair material compartment. The raw materials can include fixture components, plates, specialized hardware, and a variety of other things necessary for rack repairs.

Figure 3A:
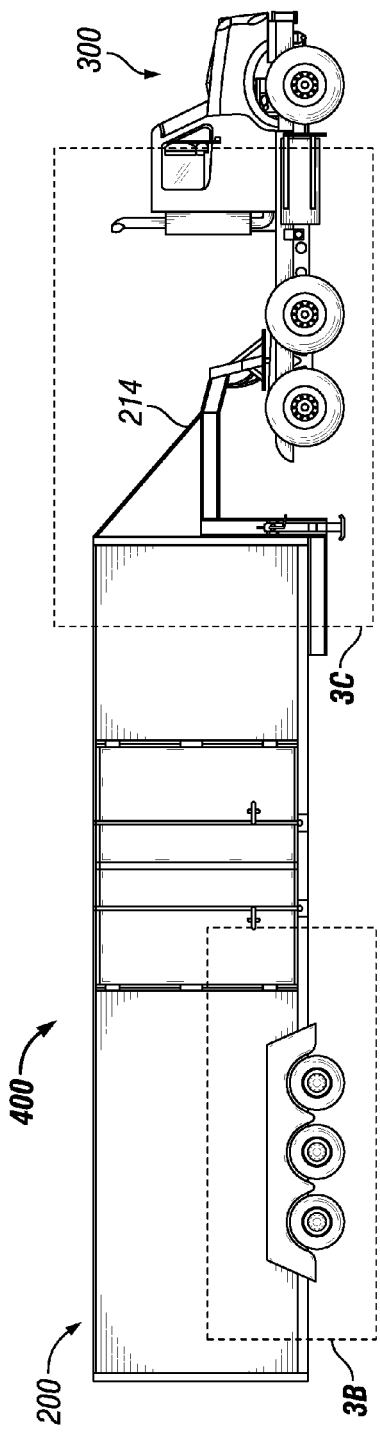
FIG. 3a shows a side view of an example of a trailer attached to a truck, the two cooperating to provide a mobile, self-contained unit for the repair and modification of industrial racks.
Figure 3C:
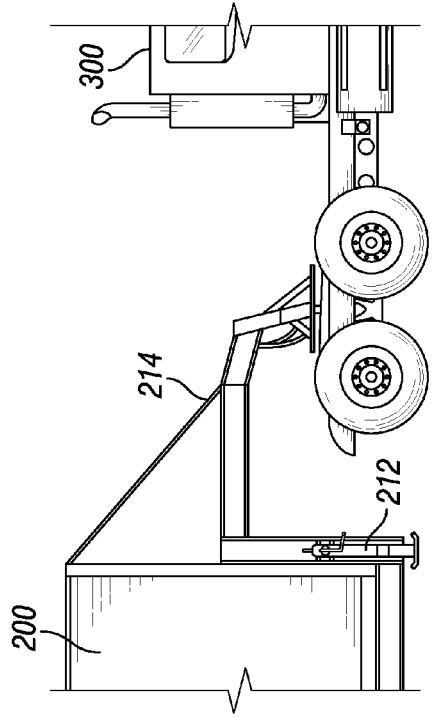
FIG. 3c shows the triple axel configuration of a trailer, which assist in spreading the load of the trailer contents across the ground, which is especially important when the forklift is in the trailer.
Figure 3B:
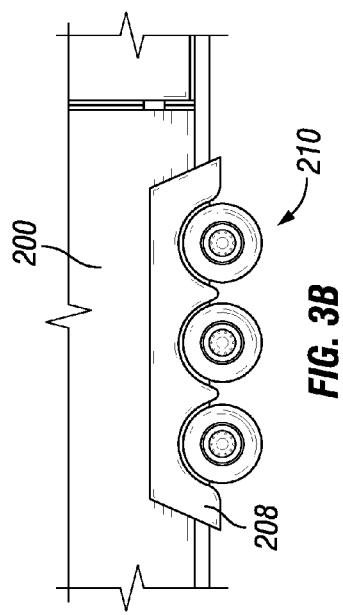
FIG. 3b shows a side view of an example of a hitch connecting a trailer used to repair or modify industrial racks according to the present invention to a truck.

The trailer 200 may be conveniently transported to factories or other locations where rack repairs are needed as part of a combination 400 of the trailer 200 and a truck 300, as shown in FIG. 3a. This obviates the need for long and expensive transporting of racks to be repaired to specialized repair facilities.

In operation, the self-contained, mobile rack repair unit is transported to any location reachable by the truck. The back door/ramp 206 is lowered and a forklift 232 is driven down the ramp 206. Equipment can be stored in the repair compartment 230 during transport of the trailer 200 and moved outside the trailer 200 once the trailer 200 has reached the repair location. For example, if the generator is of a type such that it is not permanently attached to the trailer 200, then the side doors 216, 218 are opened and a forklift can remove the generator from the repair compartment 210 and place it next to the trailer 200. The portable generator may then be attached to the breaker box by a power cord and started to supply power the tools and lights within the trailer 200.

The forklift 222 can be driven to the location of a fixture targeted for repair. The forklift 222 lifts the fixture and transports it to the trailer 200. The side doors 216, 218 of the trailer can be opened allowing the fixture to be placed in the repair and modification compartment 230. Alternatively, the fixture could be placed into compartment 230 by driving it up the ramp 206 and through the transport compartment to the repair compartment. In an alternate embodiment, the side door or doors may be configured to fold downward to form a ramp, like the back door ramp 206 on the back of the trailer 200.

Figure 9:
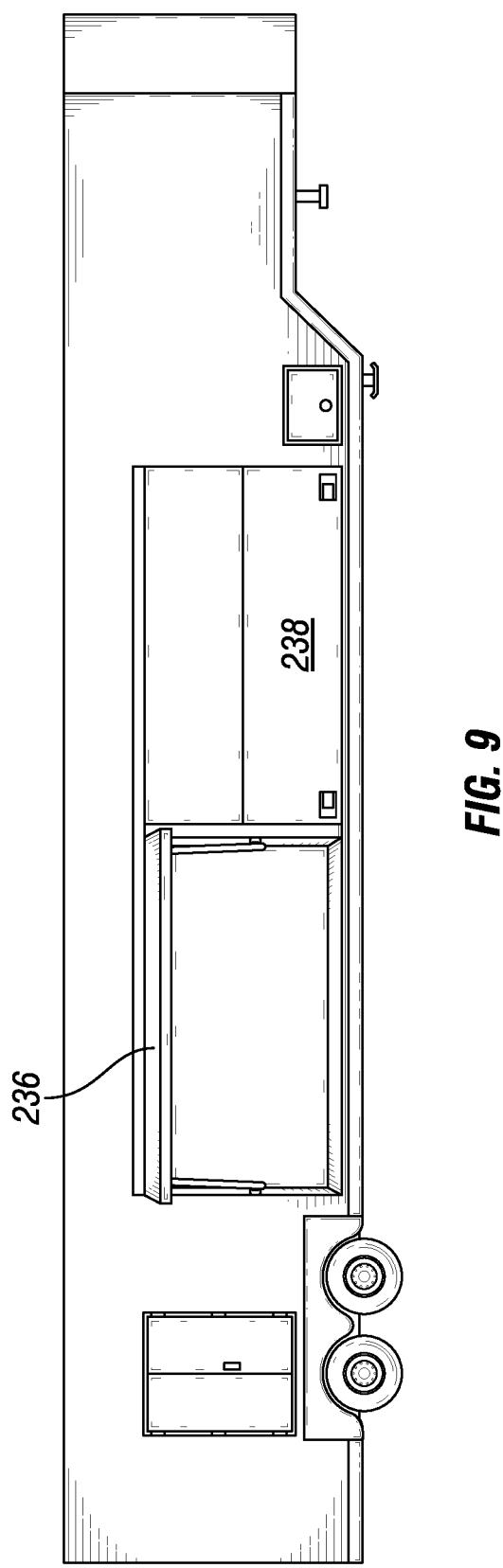
FIG. 9 shows a side view of a trailer used to repair or modify industrial racks according to the present invention with multiple exterior doom including alternative hinge capability.

FIG. 9 shows another alternative where there are multiple side doors 236,238 on the trailer 200. The alternative side doors 216,238 can be hinged to open as a ramp, as an overhang area, or as a system of panels that can form additional space in the repair compartment 230 of the trailer 200.

Once the fixture is in the repair compartment 230, the necessary repairs and modifications to the fixture are carried out using the appropriate raw materials and equipment—all stored in the trailer 200. When all repairs and modifications are made, the forklift 222 transports the fixture out of the repair compartment 230. The trailer 200 is now ready for new repair activities, whether at the same location, or at new location.

In one embodiment, a factory may move all racks requiring repair to a common area, such as a parking lot. The above method may be used to sequentially repair each rack. This will save considerable time and expense as compared to separately shipping each rack to a distant repair shop. Also, depending on the size or the rack, multiple racks may be put in the compartment so work on them may proceed simultaneously.

Figure 10:
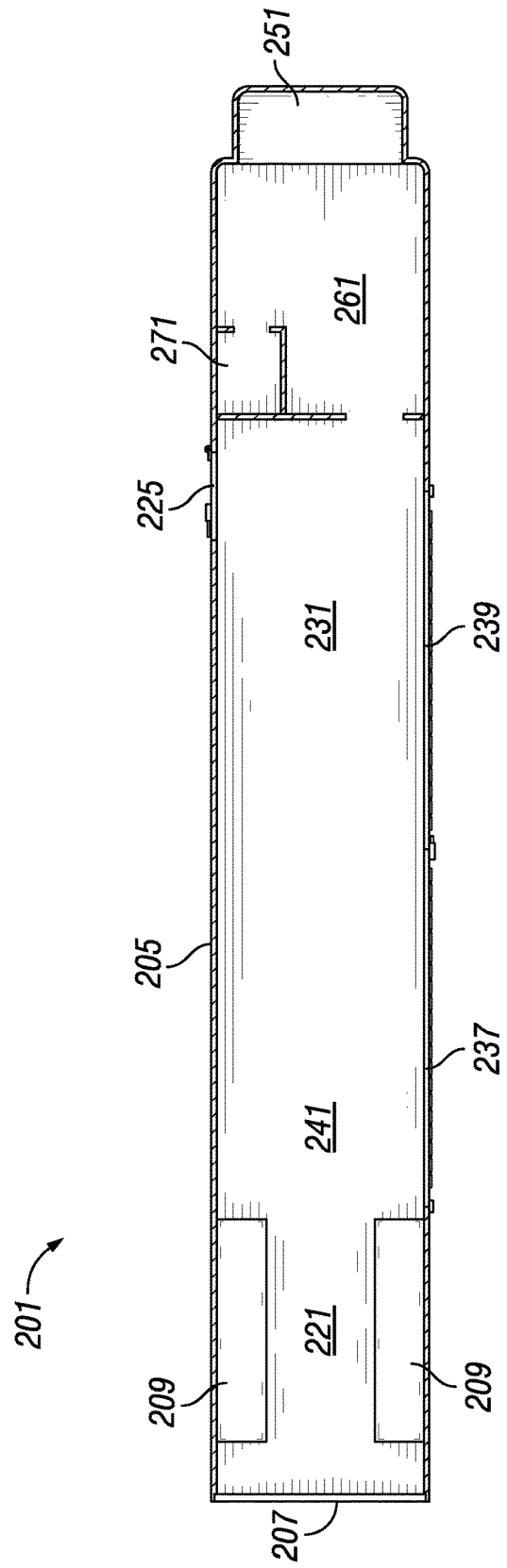
FIG. 10 shows a top view of another embodiment of a trailer used to repair or modify industrial racks according to the present invention.

In another embodiment of the present application as shown in FIG. 10, a trailer 201 can be configured with a trailer body 205, including a back door 207 configured to act as a ramp for the trailer 201; a transport compartment 221 located at the rear of the trailer body 205 near the back door and over rear-axel wheel wells 209; a repair compartment 231 adequate to house fixtures to be repaired during the repair process and the equipment necessary to complete the repairs; a side pedestrian door 225; trailer access doors 237,239 which can be hinged to create a ramp, an overhang, or additional compartment space; a storage area 261 which can store raw materials and repair equipment; an equipment room 271 which can house equipment such as an air compressor; and an accessory compartment 251 which can house accessory equipment such as HVAC units, generators, and power supply storage.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/hr "a portion" is used the item can include a portion and/or the entire item unless specifically stated to the contrary.

What is claimed is:

1. An enclosed trailer comprising:
   a trailer body;
   a transport compartment adapted to accommodate an industrial truck;
   a ramp operatively coupled to the transport compartment for the loading, and unloading of the industrial truck and a payload of the industrial truck to and from the trailer body;
   a fixture work compartment adapted to accommodate the industrial fixture during performance of work on the industrial fixture;
   a storage compartment for storage of raw materials adapted to be utilized in the performance of work on the industrial fixture in the trailer body;
   a metal working compartment configured to include metal working equipment used in performance of work on the industrial fixture; and
   a hitch adapted to operatively couple the trailer body to a powered truck for moving the trailer body to a new location when desired;
   wherein the trailer body is adapted to be a movable, self-contained industrial fixture repair and modification unit capable of onsite industrial fixture repairs and modifications.

2. The enclosed trailer of claim 1 further including an industrial truck adapted to lift and move an industrial fixture from an onsite location to the trailer body for work to be performed on the industrial fixture and for lifting and removing the industrial fixture from the trailer body back to the onsite location after work is performed on the industrial fixture.

3. The enclosed trailer of claim 1 wherein the metal working equipment further includes:
   at least one fixture component bonding apparatus for bonding components of the industrial fixture to be worked on;
   at least one fixture component bending apparatus for bending components of the industrial fixture to be worked on; and
   at least one fixture machining apparatus for machining components of the industrial fixture to be worked on.

4. The enclosed trailer of claim 1 further includes a set of trailer access doors located on a side of the trailer body and positioned to provide access to at least one compartment of the trailer body.

5. The enclosed trailer of claim 4 wherein the trailer access doors further include a hinge mechanism to provide an access feature selected from the group consisting of: a ramp, an overhang, an additional compartment, and combinations thereof.

6. The enclosed trailer of claim 1 further includes an accessory equipment compartment configured to provide storage of accessory equipment during a transportation phase and access to accessory equipment during a work performance phase.

7. The enclosed trailer of claim 6 wherein accessory equipment includes equipment selected from a group consisting of: an HVAC component, an air compressor, a generator, a power supply component, a power storage component, and combinations thereof.

8. The enclosed trailer of claim 1 further includes a reinforced wheel well on the trailer body.

9. The enclosed trailer of claim 1 wherein performance of work includes a job selected from a group consisting of: a repair, a modification, and combinations thereof.

10. The enclosed trailer of claim 1 wherein the fixture work compartment further includes a welder coupled to the trailer body in the fixture work compartment through a set of rails.

11. A method of repairing and modifying a heavy-duty industrial fixture, comprising:
  a) providing an enclosed trailer, the enclosed trailer comprising: 1) a transport compartment adapted to accommodate an industrial truck, 2) a ramp operatively coupled to the transport compartment for loading and unloading of the industrial truck and a payload of the industrial truck to and from the trailer, 3) a fixture work compartment adapted to accommodate the industrial fixture during performance of work, 4) a metal working compartment configured to provide metal working operations; 5) a storage compartment configured for raw materials, the raw materials adapted to be utilized in performance of work on the industrial fixture in the trailer, and 6) a hitch adapted to operatively couple the trailer to a truck for moving the trailer to a location when desired;
  b) moving the trailer via the truck to an onsite location having an industrial fixture targeted for performance of work;
  c) utilizing the industrial truck to transport to the trailer the industrial fixture which has been targeted for performance of work;
  d) loading the industrial fixture onto the trailer via the ramp;
  e) locating the industrial fixture in the fixture work compartment;
  f) performing desired work on the industrial fixture in the fixture work compartment;
  g) after performance of work, removing the industrial fixture from the trailer via the ramp; and
  h) delivering the industrial fixture which has undergone work back to the onsite location.

12. The method of repairing and modifying a heavy-duty industrial fixture of claim 11 wherein providing the enclosed trailer further includes the enclosed trailer including a forklift adapted to lift and move the industrial fixture from the onsite location to the trailer for performance of work on the industrial fixture, and for lifting and removing the industrial fixture from the trailer back to the onsite location after performance of work on the industrial fixture.

13. The method of repairing and modifying a heavy-duty industrial fixture of claim 11 wherein performance of work further includes a job selected from a group consisting of: a repair, a modification, and combinations thereof.

14. The method of repairing and modifying a heavy-duty industrial fixture of claim 11 wherein providing the enclosed trailer further includes the metal working operations including at least one fixture component bonding apparatus for bonding components of the industrial fixture for performance of work, at least one fixture component bending apparatus for bending components of the industrial fixture for performance of work, and at least one fixture machining apparatus for machining components of the industrial fixture for performance of work.

15. The method of repairing and modifying a heavy-duty industrial fixture of claim 11 wherein providing the enclosed trailer further includes the enclosed trailer including a set of trailer access doors configured to include a hinge mechanism to provide an access feature selected from the group consisting of: ramp, an overhang, an additional compartment, and combinations thereof.

16. The method of repairing and modifying a heavy-duty industrial fixture of claim 11 further includes relocating equipment and components from a transportation location to a work performance location.

* * * * *